April 29, 1969     J. LEMOINE     3,441,036

ELECTRIC AGITATOR

Filed Aug. 2, 1967

INVENTOR.

JULES LEMOINE

United States Patent Office 3,441,036
Patented Apr. 29, 1969

3,441,036
ELECTRIC AGITATOR
Jules Lemoine, 8428 Jefferson Highway,
Harahan, La. 70123
Filed Aug. 2, 1967, Ser. No. 657,808
Int. Cl. B08b 3/00, 13/00
U.S. Cl. 134—140                  3 Claims

ABSTRACT OF THE DISCLOSURE

An apparatus for agitating a basket, the device including an electrically driven motor having a drive unit at each end, each of which alternately lift an opposite side of the basket in a rapid manner so as to shake the contents therewithin.

---

This invention relates generally to vibratory shakers. A principal object of the present invention is to provide an electric agitator for the purpose of cleaning metal parts contained within a basket that is rapidly shaken within a fluid cleaner.

Another object of the present invention is to provide an electric agitator which includes a motor having a drive unit at each end, each drive unit being in engagement with one end of a basket so as to alternately lift the same and thus cause a rapid shaking thereof.

Yet a further object of the present invention is to provide an electric agitator which may be readily placed on the rim of a container so as to allow the basket to depend therewithin and thus allow cleaning of objects contained within the basket, it being understood that a cleaning solution is contained within the container.

Other objects of the present invention are to provide an electric agitator which is simple in design, inexpensive to manufacture, rugged in construction, easy to use and efficient in operation.

These and other objects will be readily evident upon a study of the following specification and the accompanying drawing wherein.

Figure 1:
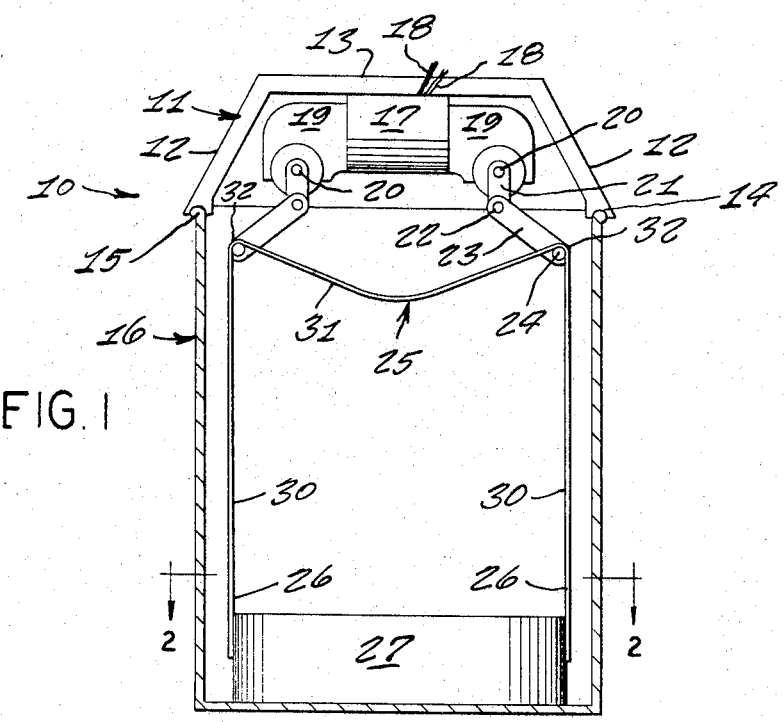
FIGURE 1 is a side elevation view of the present invention shown supported within a container shown in cross-section.
Figure 2:
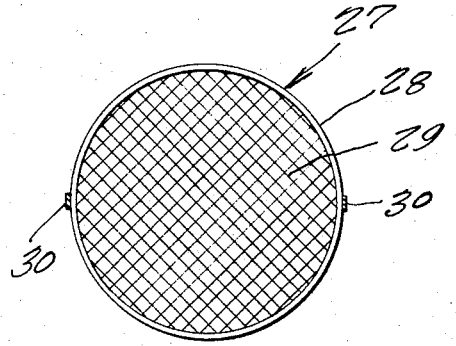
FIGURE 2 is a cross sectional view taken on the line 2—2 of FIGURE 1.

Referring now to the drawing in detail, the reference numeral 10 represents an electric agitator, according to the present invention, wherein there is a bracket 11 of generally U-shaped configuration, the bracket having diagonally, downwardly extending legs 12 that are connected at their upper ends by an interconnecting leg 13, the lower ends of the legs 12 being provided with notches 14 so as to receive therein the rim 15 at the upper end of a container 16.

A motor 17 is mounted on the underside of the leg 13, the motor being connected by electrical wires 18 to a power source (not shown). A drive unit 19 is mounted at each opposite end of the motor, the drive units being mechanically operated by the motor. Each drive unit has at its output end, a rotating shaft 20 upon which there is rigidly secured one end of an arm 21, the opposite end of the arm being connected pivotally free by means of a pin 22 to one end of a link 23, the opposite end of the link 23 having an extending pin 24 over which there is hooked a bail 25.

The bail 25 comprises a generally U-shaped member which is connected at its opposite end 26 to opposite sides of a basket 27 having a side wall 28 and a mesh bottom 29. The bail may be made from a metal band and is formed to have a pair of vertically upstanding, parallel legs 30 and an interconnecting portion 31 at the upper ends of the legs 30, the interconnecting portion 31 being downwardly arched so as to provide upstanding loops 32 beneath which the projecting pins 24 may be received so as to support the bail.

Figure 3:
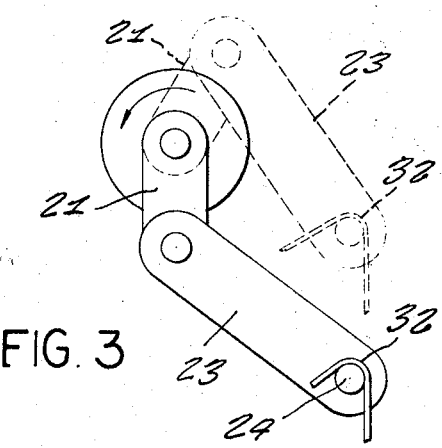
FIGURE 3 is a fragmentary enlarged side elevation view of the drive unit structure shown in FIGURE 1 shown in different positions.

In operative use, the container 16 is filled with a cleaning solution and the basket 27 of the electric agitator is loaded with parts which are to be cleaned within the solution. Such parts may comprise any object which may be used in any particular trade. Thus in the automotive trade, carburator parts may be thoroughly cleaned by being placed within the basket. Likewise the basket may be made to contain objects to be cleaned in different fields of work. The electric agitator is then lowered over the container 16 with the basket being placed therewithin and the notches 14 of the bracket 11 being placed over the rim 15 of the container, thus supporting the electric agitator upon the container. The electric wires 18 are connected to a power source and the motor 17 is thus turned on so as to drive the drive units 19 which, as shown in FIGURE 3 of the drawing, will cause the bail to be alternately raised and lowered at each corner, thus lifting the basket correspondingly, which when accomplished in a rapid manner will cause a vibratory shaking so as to thoroughly shake the parts contained within the basket and thus allowing the cleaning solution to thoroughly clean the same.

I claim:
1. In an electric agitator, the combination of a bracket, a motor support upon said bracket, means for supporting said bracket upon the upper end of a container containing a cleaning solution, drive means operated by said motor, said drive means being connected to a bail of a basket placed within said container for cleaning parts contained within said basket, said bracket comprising a generally U-shaped member having downward diverging legs, said legs being interconnected at their upper ends by an interconnecting leg, the lower ends of said downwardly extending legs having notches therein for receiving the rim of said container, said motor being supported from the underside at the center of said interconnecting leg, said drive means comprising a drive unit at each end of said motor, each said drive unit having an output shaft having an arm connected thereto, said arm extending radially and having at its outer end a pin that is connected pivotally free to one end of a link, and the opposite end of said link having an extending pin upon which said bail is supported.

2. The combination as set forth in claim 1 wherein said bail comprises a generally U-shaped member having parallel upward extending legs that are interconnected at their upper ends by an interconnecting portion, said interconnecting portion being downwardly arched so as to form upwardly extending loops adjacent the upper ends of said side legs, said loops being placed over said extending pins of said links, and the lower ends of said bail legs being connected to opposite sides of said basket.

3. The combination as set forth in claim 2 wherein said basket comprises a member having a cylindrical side wall and a mesh bottom.

References Cited

UNITED STATES PATENTS

| | | | |
|---|---|---|---|
| 2,442,675 | 6/1948 | Boss | 134—140 |
| 2,663,304 | 12/1953 | Logan | 130—140 XR |
| 2,715,409 | 8/1955 | Wachs | 134—140 |
| 3,006,351 | 10/1961 | Grube | 134—160 XR |

ROBERT L. BLEUTGE, *Primary Examiner.*

U.S. Cl. X.R.

134—164